May 9, 1950      C. P. SCHWARTZ      2,506,619
COUPLING FOR TENSION BOLTS
Filed June 6, 1947
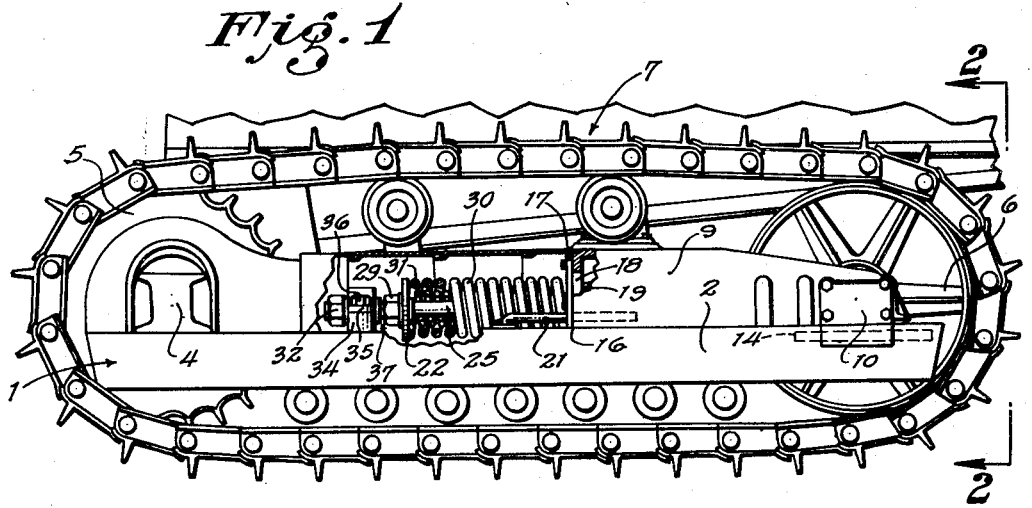
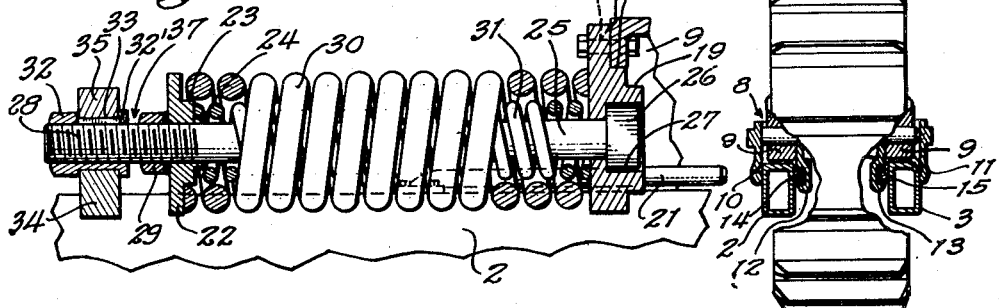
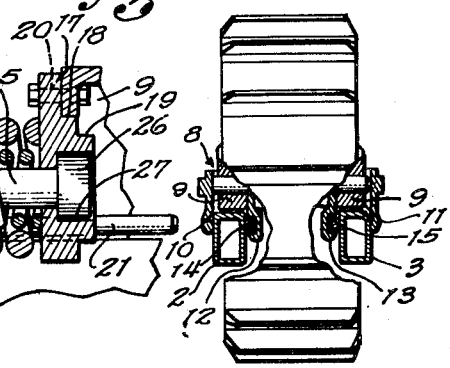
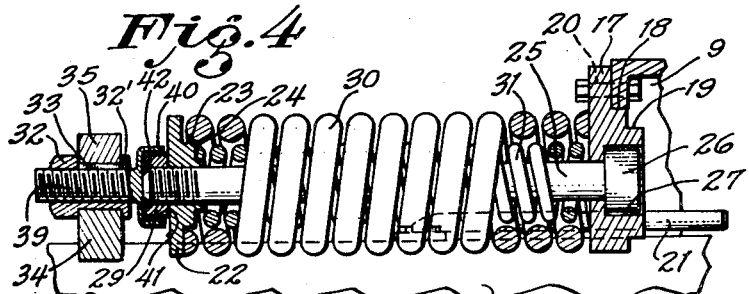
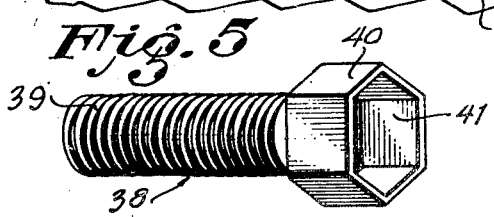
INVENTOR,
CHARLES P. SCHWARTZ,
BY
ATTORNEY.

Patented May 9, 1950

2,506,619

UNITED STATES PATENT OFFICE 2,506,619

COUPLING FOR TENSION BOLTS

Charles P. Schwartz, Los Angeles, Calif., assignor to Silver Booster Mfg. Co., Los Angeles, Calif.

Application June 6, 1947, Serial No. 752,941

6 Claims. (Cl. 305—10)

The present invention relates broadly to tractors, and more specifically to a coupling for tension bolts.

The average tractor which utilizes continuous track incorporates in its construction a spring-loaded tension bolt for each track. It is general practice to provide a driving sprocket and a track roller, sometimes called an idler, for each track. The idler is permitted limited longitudinal movement relative to the tractor frame. Thus, as the track rolls over ground, rocks and other substance which may become lodged in the track, and might otherwise break the track, or cause damage thereto, are prevented from causing such damage by permitting the idler to move against the spring-loaded tension bolt. Immediately the track is cleared of the obstruction, the idler assumes its normal posiiton, which removes slack from the track. The tension bolt holds the tension springs, and, as a rule, the idler moves what is termed a yoke member carrying a plate which bears against one end of the tension springs. At the opposite end of the springs is a further plate member, and between the two plate members, and axially of the springs, is positioned the tension bolt. This tension bolt carries a pre-load nut which bears against one of the plate members and when turned, regulates compression of the springs. The outer threaded end of the tension bolt carries a track adjusting nut, which nut is supported by a member fixedly secured to the tractor frame. Obviously, a tractor is subjected to rough usage, and various means is provided for controlling vertical and side movement of the track idler relative to the frame. However, use of the tractor causes wear in the parts, with the result that both vertical and side movement of the idler results in destructive forces being applied to the tension bolt, which is held quite rigidly at one end by the track adjusting nut. Loading of the springs between the spring retainer plates, plus that portion of the tension bolt interposed between the plates, provides a solid structure and one that does not give easily. As a consequence, the tension bolt often crystallizes and breaks, breakage usually occurring between the pre-load nut for the tension springs and the track adjusting nut. When this occurs, it is quite an arduous job to replace the tension bolt, often requiring from 6 to 8 hours of time.

An object of the present invention is to improve the tension bolt structure, so that breakage of the type heretofore described is prevented.

A further object is the provision of a coupling for tension bolts which may be incorporated in the tractor construction initially, or may form a replacement unit therefor and which, when used as a replacement unit, is easily and simply installed in a matter of minutes instead of hours, is inexpensive to purchase, and which is capable of producing superior results when subjected to rough usage.

Other objects will readily suggest themselves to those skilled in the art to which this invention appertains, and with the above-named and other objects in view, the invention consists in the novel and useful provision, formation, construction, association, and relative arrangement of parts, members and features, all as shown in one embodiment in the accompanying drawing, described generally, and more particularly pointed out in the claims.

In the drawing:

Figure 1 is a fragmentary side elevation of a tractor incorporating the invention, Figure 2 is a fragmentary front elevation, partly in section, and taken on the line 2—2 of Figure 1, Figure 3 is a vertical section showing a tension bolt surrounded by helical springs of a type which is ordinarily use on tractors, Figure 4 shows the application of the invention to the track tension bolt, and, Figure 5 is a perspective view of one member of the invention.

Referring now with particularity to the drawing, I have shown in Figure 1 a tractor, the upper parts thereof, such as the cab, not being detailed. This particular tractor is known as Diesel D8 and is manufactured by the Caterpillar Tractor Company, of Peoria, Illinois. Other tractors are similarly constructed, and the particular tractor is illustrative of an application of the invention, as hereinafter set forth. In the tractor shown in Figure 1, one side thereof is illustrated, the opposite side being of like construction. For that reason, singular statements apply to the other side as well. In this tractor, frame 1 has two separated portions 2 and 3, as see Figure 2, the separated portions being braced at spaced points by transverse pieces, not shown. One end of the frame 1 carries a bearing support 4 for a sprocket 5. This sprocket is usually driven by a motor in the tractor. The opposite end of the tractor is provided with an idler 6 in the form of a wheel or roller, and passed between the sprocket 5 and wheel 6 is a continuous track 7, the track engaging the teeth of the sprocket 5, as illustrated. Associated with the shaft assembly 8 of the idler and with a yoke 9, are guide plates 10 and 11, and collars 12 and 13. It will be noted that one guide plate and one collar cooperates with each track frame member. The guide plates engage the outer surface of the members 2 and 3, while the collars 12 and 13 engage elongated ribs 14 and 15 secured to the inner faces of the track frame members. The collars 12 and 13 are of the yoke type and overlie the ribs in each instance. It is intended that the guide plates 10 and 11 should control side movement of the idler 6, while the collars 12 and 13 in cooperation with the ribs 14 and 15 should hold the assembly against vertical movement. The yoke 9 extends between the track frame members 2 and 3, and is bifurcated at one end so as to straddle the idler 8 (see Figure 2). The ends 16 of the yoke carries a spring-retainer plate 17. Plate 17 is provided on one face with a circular flange 18 and an enlargement 19, which may be circular in outline. The flange 18 fits within and centers the yoke. The plate 17 may be provided with a series of transverse bores 20, through which bolts are passed for securing the plate to the yoke, as illustrated in Figure 1. Track frame members 2 and 3 each have bolted thereto an elongated rod 21, which is passed through an opening in plate 17. These rods are termed guides or guide rods, and act to control horizontal movement of the yoke relative to the frame members 2 and 3.

A spring retainer plate is provided at 22. This plate may have circular flanges 23 and 24. Adapted to extend between the plates 17 and 22 is a bolt 25. This bolt is provided with a squared head 26, which is fitted within a correspondingly squared socket 27 in plate 17. A portion of the bolt is screw-threaded at 28. This bolt is adapted to carry on the screw-threads thereof what is known as a pre-lead nut 29. Interposed between the spring-retainer plates 17 and 22 are outer and inner helical springs 30 and 31. Carried at the outermost end of the bolt 25 is a track adjusting nut 32. This nut is usually partially split longitudinally as shown at 32'. Nut 32 is formed with an annular groove 33. Secured between the frame members 2 and 3 is a block 34, which block carries a removable cap 35, usually held to the block by bolts 36. The block and cap are both formed with a semi-circular concavity, which concavities embrace nut 32 at the annular groove portion thereof. In the construction just described, the screw-threaded end of the tension bolt 25 is held rigidly between the block 34 and cap 35. As parts of the tractor wear, having in mind specifically the guide plates 10 and 11, the collars 12 and 13, and ribs 14 and 15, vertical and side movement of the idler and of the track results. This vertical and side movement is communicated by the yoke to the track tension bolt 25, and as this track tension bolt is held quite rigidly, breakage often occurs in the zone 37. Experience has shown that breakage occurs at this zone in the majority of instances. When breakage occurs, the device of the present invention may be incorported within a minimum of time.

As illustrative of one embodiment of the invention, I am assuming a repair of the structure resultant upon breakage of the tension bolt at the zone 37, and to effect a repair, I have provided a bolt 38, shown in Figure 5. This bolt has a threaded shank 39, and an enlarged head 40, provided with an open-ended socket 41 corresponding in outline to that of the nut 29. As a rule, the socket loosely receives the nut 29, so that there is a slight play between the two members. Furthermore, the socket portion is of sufficient depth to fully receive the nut, as best illustrated in Figure 4. When breakage of the tension bolt occurs at the zone 37, the tension bolt is cut off evenly with the outermost end of the nut 29 and the nut and bolt are secured together in any approved manner, such as by welding or keying as indicated at 42. The cap 35 is removed and the broken end of the tension bolt unscrewed from the track adjusting nut 32. The screw-threaded shank 39 is then threaded within nut 32 and the nut replaced between block 34 and cap 35, with the socketed head embracing the pre-load nut 29, as shown in Figure 4.

The operation, uses, and advantages of the invention just described, are as follows:

If the tension bolt breaks between nuts 29 and 32, the broken end piece of the bolt is removed through the expedient of removing cap 35 and disconnecting the nut 32 therefrom. Thereafter, the track adjusting nut is threaded upon the screw-threaded shank of the bolt, of the type shown in Figure 5. Nut 32 is replaced between the block 34 and cap 35, with the socketed head of bolt 38 embracing nut 29.

The track adjusting nut 32 may be turned upon the screw-threads 39 without causing any rotation of the bolt 38, for the reason that the socketed head 41 engages the nut 29, which has been secured fixedly to tension bolt 25, the tension bolt being prevented from rotating due to the squared head 26 fitting within the squared socket of plate 17. Before attempting to rotate the track adjusting nut, the cap 35 is loosened, as this cap functions to compress the split portion 32' of the nut to cause it to grip the threads 39, under ordinary circumstances.

As the idler moves relative to the track both vertically and laterally, such movement is communicated by the bolt 25 to the head 40. However, as the fit is loose between the nut 29 and the socketed portion of the head 40, no damage results to either the head 40 or to the tension bolt 25, and breakage of the tension bolt is obviated.

A tractor when operating is subjected to dirt which often cakes on the operating parts. Dirt may pack between the nut 32 and the threaded end of the tension bolt 25, and thus prevent a turning of the nut. With my invention, the nut 32 together with bolt 38 may be removed without disturbing the tension bolt 25, whereupon the parts may be easily cleaned and replaced in position of service.

I claim:

1. In tractor construction, a frame, a sprocket for one end of the frame, an idler for the opposite end thereof, and a continuous track passed between said sprocket and said idler, the combination therewith of: means for maintaining a tension on the track through said idler, said means including two plates, a tension bolt extending between said plates, a coil spring surrounding said tension bolt and interposed between the plates, means of connection between the idler and one of said plates for normally urging the idler in one direction, a second bolt, means for securing said second bolt to the frame, and a loose coupling means between the two bolts.

2. In tractor construction, a track frame, a sprocket carried by one end of said frame, an idler for the opposite end thereof, and a continuous track passed between the sprocket and idler, the combination therewith of a yoke movably supported by the frame and carrying the idler, a plate secured to said yoke, a second plate, a bolt extending between said plates, a coil spring surrounding the bolt and interposed between said plates, a second bolt provided with threads, a nut threaded to said second bolt, means between said nut and the frame for securing said nut against longitudinal movement, and loose coupling means between said two bolts, a turning of said nut controlling tension in the track.

3. A tractor incorporating a drive sprocket, an idler, a continuous track passed between the sprocket and idler, and means for maintaining the track in tension, including a pair of bolts in axial alignment, means for adjustably securing one of the bolts to the tractor, means for securing the other bolt in working relationship with the idler, and coupling means between the two bolts, said coupling means comprising a head carried by one bolt and formed with an open-sided angular walled socket, an angular-sided nut carried by the other bolt and loosely received in the socket.

4. In a tractor, a track tension bolt, a pair of plates through which said tension bolt is passed, a coil spring surrounding the tension bolt and interposed between said plates, said bolt being in non-rotatable relationship to one of said plates, a second bolt, a nut in threaded engagement with said second bolt, and a coupling between the two bolts, said coupling means comprising a head carried by the second bolt and formed with an open-sided angular wall socket, and an angular sided nut carried by the tension bolt and loosely received in the socket.

5. A tractor having a frame, a sprocket journaled to said frame, an idler movably carried on the frame, and a continuous track passed between said sprocket and idler, and means for urging said idler in one direction to impose tension in the track, said means including two plates, a tension bolt extending between said plates, a coil spring interposed between the plates and surrounding the tension bolt, one end of said tension bolt provided with a nut, a second bolt, a nut in threaded engagement with said second bolt, and means for securing the second bolt to the frame, said second bolt provided with a socketed head adapted to receive the nut on the tension bolt.

6. A coupling for tension bolts as disclosed, including a pair of plates, one of which is formed with an angular-sided socket, a tension bolt passed through said plates and formed with an angular-sided head for reception in the angular-sided socket, a nut secured to the tension bolt and positioned externally of the second plate, a coil spring surrounding the tension bolt and interposed between said plates, a second bolt formed with a socketed head, the tension bolt and said second bolt being in co-axial relationship, the nut on said tension bolt being received in the socketed head of the second bolt, a nut carried by said second bolt, and a frame supporting the second named nut and one of said plates.

CHARLES P. SCHWARTZ.

REFERENCES CITED

The following references are of record in the file of this patent:

UNITED STATES PATENTS

| Number | Name | Date |
|---|---|---|
| 2,022,079 | Eberhard | Nov. 26, 1935 |
| 2,284,821 | Heaslet | June 2, 1942 |